US012010072B2

(12) United States Patent
Fang et al.

(10) Patent No.: US 12,010,072 B2
(45) Date of Patent: Jun. 11, 2024

(54) TIMING SKEW CALIBRATION IN TIME-INTERLEAVED DATA CONVERTERS IN CARRIER AGGREGATION

(71) Applicant: Avago Technologies International Sales Pte. Limited, Singapore (SG)

(72) Inventors: Jun Fang, San Jose, CA (US); John Szeming Wang, Sunnyvale, CA (US); Sian She, Lafayette, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 120 days.

(21) Appl. No.: 17/697,821

(22) Filed: Mar. 17, 2022

(65) Prior Publication Data

US 2023/0299933 A1  Sep. 21, 2023

(51) Int. Cl.
*H04L 5/14* (2006.01)

(52) U.S. Cl.
CPC ..................... *H04L 5/14* (2013.01)

(58) Field of Classification Search
CPC .................... H04L 5/14; H04L 5/00
See application file for complete search history.

(56) References Cited

U.S. PATENT DOCUMENTS

| | | | | |
|---|---|---|---|---|
| 8,874,117 B2* | 10/2014 | Narasimha | ............ | H04L 5/0007 455/438 |
| 9,094,905 B2* | 7/2015 | Bai | ........................ | H04L 5/001 |
| 9,668,167 B2* | 5/2017 | Chen | ...................... | H04L 1/1854 |
| 9,992,693 B2* | 6/2018 | Kuo | ........................ | H04W 24/02 |
| 2015/0189610 A1* | 7/2015 | Siomina | ..................... | H04L 5/14 370/280 |
| 2015/0215078 A1* | 7/2015 | Chen | ...................... | H04L 5/0055 370/336 |
| 2015/0230268 A1* | 8/2015 | Chen | ................. | H04W 56/0005 370/280 |
| 2016/0226650 A1* | 8/2016 | Chen | ....................... | H04L 5/001 |
| 2016/0242058 A1* | 8/2016 | Kazmi | ................... | H04W 72/23 |
| 2016/0295560 A1* | 10/2016 | Chen | ..................... | H04L 5/0094 |
| 2017/0302419 A1* | 10/2017 | Liu | ......................... | H04L 5/0091 |
| 2018/0368114 A1* | 12/2018 | Chen | ....................... | H04L 5/001 |
| 2021/0392602 A1* | 12/2021 | Sengupta | ........... | H04W 56/0005 |

\* cited by examiner

*Primary Examiner* — Bailor C Hsu
(74) *Attorney, Agent, or Firm* — Quarles & Brady LLP

(57) ABSTRACT

An apparatus includes an analog to digital converter configured to receive one or more first frames of a first component carrier signal having a first uplink-downlink subframe pattern, and receive one or more additional frames of at least one additional component carrier signal, the one more or more additional frames including one or more second frames of a second component carrier signal, the at least one additional component carrier signal including the second component carrier signal. The apparatus may further include control logic configured to activate timing skew calibration of at least one of the first or second component carrier signals based, at least in part, on an operating mode of the second component carrier signal and respective symbols of the first component carrier signal and second component carrier signal.

20 Claims, 7 Drawing Sheets

TIMING SKEW CALIBRATION IN TIME-INTERLEAVED DATA CONVERTERS IN CARRIER AGGREGATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for timing skew calibration in time-interleaved data converters.

BACKGROUND

Time-interleaved data converters, such as analog to digital converters (ADCs) and digital to analog converters (DACs) have been widely used for various systems. Time-interleaved ADCs (TI-ADCs) include large numbers of individual unit-ADCs requiring multi-level sampling stages to capture and de-multiplex wide-band input signals for digitizing by unit-ADCs. Given the large number of unit ADCs within a TI-ADC, and the high clock speeds, alignment of the high-speed sample clocks between different levels directly affects system performance, such as signal conversion quality from the analog-to-digital domain. This becomes especially problematic in cases of carrier aggregation (CA).

Thus, methods, systems, and apparatuses for timing skew calibration for TI-ADCs in carrier aggregation are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
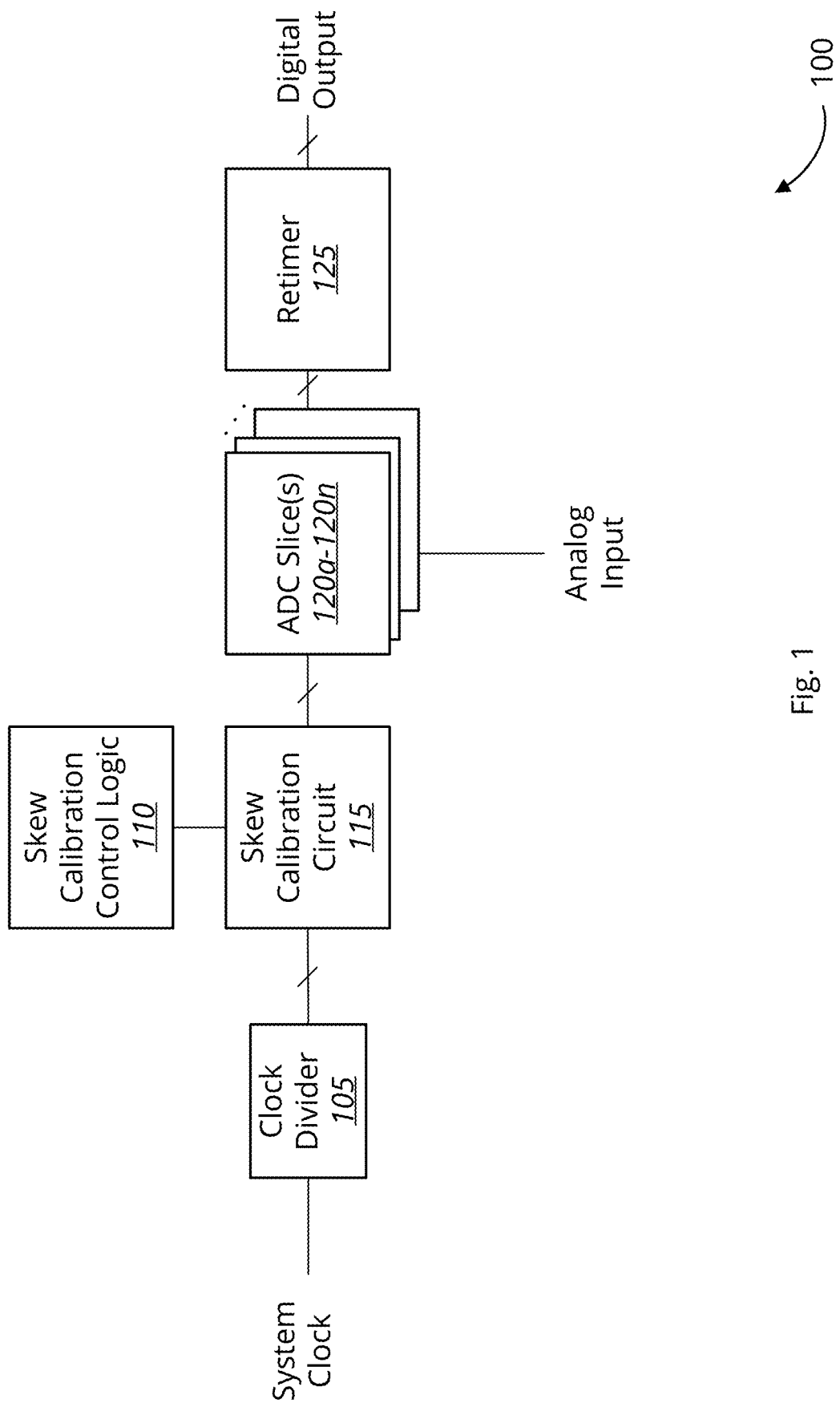
FIG. 1 is a schematic block diagram of a system for timing skew calibration control in a TI-ADC, in accordance with various embodiments.

Various embodiments provide tools and techniques for timing skew calibration in TI-ADCs in CA.

In some embodiments, a method for timing skew calibration control in TI-ADCs in CA is provided. The method may include receiving one or more first frames of a first component carrier signal having a first uplink-downlink subframe pattern, receiving one or more additional frames of at least one additional component carrier signal, the one more or more additional frames including one or more second frames of a second component carrier signal, the at least one additional component carrier signal including the second component carrier signal, and activating timing skew calibration of at least one of the first or second component carrier signals based, at least in part, on an operating mode of the second component carrier signal and respective symbols of the first component carrier signal and second component carrier signal.

In some embodiments, an apparatus for timing skew calibration control in TI-ADCs in CA is provided. The apparatus may include an analog to digital converter configured to receive one or more first frames of a first component carrier signal having a first uplink-downlink subframe pattern, and receive one or more additional frames of at least one additional component carrier signal, the one more or more additional frames including one or more second frames of a second component carrier signal, the at least one additional component carrier signal including the second component carrier signal. The apparatus may further include a control logic configured to activate timing skew calibration of at least one of the first or second component carrier signals based, at least in part, on an operating mode of the second component carrier signal and respective symbols of the first component carrier signal and second component carrier signal.

In further embodiments, an apparatus for timing skew calibration control in TI-ADCs in CA may include a non-transitory computer readable medium in communication with the processor, the non-transitory computer readable medium having encoded thereon a set of instructions executable by the processor to execute various functions. The set of instructions may include instructions executable by the processor to receive one or more first frames of a first component carrier signal having a first uplink-downlink subframe pattern, receive one or more additional frames of at least one additional component carrier signal, the one more or more additional frames including one or more second frames of a second component carrier signal, the at least one additional component carrier signal including the second component carrier signal, and activate timing skew calibration of at least one of the first or second component carrier signals based, at least in part, on an operating mode of the second component carrier signal and respective symbols of the first component carrier signal and second component carrier signal.

In the following description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Conventional approaches to skew calibration are not applicable to examples where two carriers are aggregated and present at the input of a TI-ADC array. Specifically, in cases of two-component carrier (CC) CA, calibration using conventional techniques cannot be achieved. As used herein, a component carrier may refer to a carrier signal (e.g., a frequency block) to be (or being) aggregated with another carrier signal in CA. The embodiments set forth below improve the performance of TI-ADC systems by providing an efficient solution to skew calibration in two-CC cases, focusing on specific frequency division duplex (FDD) and time division duplex (TDD) (e.g., FDD-TDD), and TDD-TDD combinations, by utilizing TDD timing control and carrier detection.

FIG. 1 is a schematic block diagram of a system for timing skew calibration control in a TI-ADC, in accordance with various embodiments. The system 100 includes clock divider 105, skew calibration control logic 110, skew calibration circuit 115, one or more ADC slices 120a-120n, and a retimer circuit 125. It should be noted that the various components of the system 100 are schematically illustrated in FIG. 1, and that modifications to the various components and other arrangements of system 100 may be possible and in accordance with the various embodiments.

In various embodiments, a clock input to the system is coupled to the clock divider 105, which may divide the clock into one or more input clock signals for each of the one or more ADC slices 120a-120n. The clock divider 105 is coupled to a skew calibration circuit 115, which is further coupled to skew calibration control logic 110. The skew calibration circuit 115 may be configured to calibrate timing skew of the input clock signal according to the skew calibration control logic 110. Specifically, timing skew (also commonly called "clock skew") may refer to differences in the clock signal (e.g., differences in the relative phase of the input clock signals) from an expected relative phase of the input clock signals at each of the respective ADC slices 120a-120n and/or respective sub-ADCs. Thus, skew calibration circuit 115 may calibrate timing skew of the respective clock signals provided to each of the one or more ADC slices 120a-120n to correct for these differences in phase. The one or more ADC slices 120a-120n may further receive, as input, a respective "slice" of an analog input signal that has been sliced into an n-number of slices, and convert the respective slice of the analog input signal into a respective slice of the digital output signal. Accordingly, an ADC slice may refer to a respective set of sub-ADCs that processes a respective slice of the input signal. The outputs of each of the one or more ADC slices 120a-120n may further be coupled to a retimer circuit 125, which may adjust timing of the outputs of the respective ADC slices (e.g., slices of the digital signal) to form a digital output signal, and provide the digital output signal to a downstream processor (e.g., a digital signal processor (DSP)).

In various embodiments, the one or more ADC slices 120a-120n are part of a TI-ADC, each ADC slice of the one or more ADC slices 120a-120n further comprising one or more respective sub-ADCs. The first ADC slice 120a may receive a first clock signal from the clock divider 105, which includes a first-level clock signal of a track-and-hold (T&H) circuit (e.g., a multi-level T&H circuit). The first-level clock signal may be generated, in some embodiments, by a clock generator, such as a first clock generator. The T&H circuit, also referred to as "sample-and-hold" circuit, is an input sampling circuit for each of the one or more ADC slices 120a-120n.

In various examples, the system clock, for example an I/IB/Q/QB clock from a receiver phase-locked loop (PLL), may be divided via the clock divider 105. Clock divider 105 is configured to divide the input clock into a respective n-number of divided clocks corresponding to each of an n-number of channels (e.g., a respective ADC slice of the one or more ADC slices 120a-120n), where n is an integer. The divided clock signals are then provided to skew-calibration circuit 115, which may be configured to remove the sampling time mismatch at the T&H. Skew calibration circuit 115 may calibrate the divided clock signals according to skew calibration control logic 110. In some examples, the clock skew may be adjusted by adjusting a number of clock inverters that are turned on. Thus, in various examples, a first-level clock signal (e.g., a skew-calibrated divided clock signal) is generated, and provided to a respective ADC slice 120a-120n.

In various embodiments, skew calibration control logic 110 may include hardware, software, or a combination of hardware and software. The skew calibration control logic 110 may be configured to control skew calibration of the divided clock signals based, at least in part, on a TDD radio frame of one or more TDD CCs in a two-CC CA system. Specifically, in various examples, skew calibration control logic 110 may be configured to control skew calibration activation in two, two-CC scenarios: FDD-TDD and TDD-TDD. As used herein, FDD-TDD may refer to the two-CC scenario in which a 4G-LTE CC is in FDD operation, and a 5G-NR CC is in TDD operation. Similarly, TDD-TDD may refer to the two-CC scenario in which a 4G-LTE CC and 5G-NR CC are both in TDD operation. In current 5G-NR deployments in the 3.5 GHz mid-band, all-network timing synchronization may typically be achieved by using the same TDD frame structure configuration and absolute timing reference. Multiband operation, such as CA with two-CC, becomes mandatory when 3.5 GHz band TDD is aggregated with 2 GHz and 2.5 GHz bands, which may operate in either FDD or TDD. As will be described in greater detail below, the proposed methods and associated control scheme of the skew calibration control logic 110 provides an efficient solution for mitigating singular cases of timing skew mismatch in the skew timing calibration.

In various examples, in TDD operation, 4G-LTE utilizes frames having a total duration of 10 milliseconds (ms). Each frame may comprise 10 subframes, each subframe having a duration of 1 ms. Each LTE TDD frame may be divided into a 6×10 matrix of subframes for a total of 60 subframes (or 120 resource blocks (RB), two RBs per subframe). Each RB includes one slot and 12 subcarriers, where each slot is one half-subframe. Each slot includes 7 symbols. Each RB may further comprise a plurality of resource elements (RE), where each resource element is a combination of one subcarrier and one symbol. Accordingly, in the example above, each RB includes 84 REs.

For each frame, 4G-LTE utilizes fixed TDD UL-DL patterns. In each frame, the patterns are referred to as TDD configuration numbers 0, 1, 2, 3, 4, 5, and 6. In various embodiments, the skew calibration control logic 110 may be configured to use, or cause to be used, uplink (UL)— downlink (DL) patterns having periodicity of 5 ms (half-frame) for downlink (DL) to DL-UL transition. In various examples, a UL-DL pattern may refer to a pattern of subframe types of a frame (or multiple frames). In some examples, this may correspond to TDD configuration numbers 0, 1, 2, and 6 for DL-UL transitions. For DL-UL switching, a guard period (GP) may be utilized between DL-UL transitions. In some examples, GP may refer to a time period during which no data is exchanged on the respective channel (e.g., CC). The GP is implemented during a special subframe (referred to interchangeably as a "GP" subframe or an "S" subframe). In one example, a GP subframe includes 7 DL symbols (denoted as "D"), followed by a GP of two symbols (denoted as "G"), and 5 UL symbols (denoted as "U").

As used herein, UL (uplink) may refer to upstream communication. Using the example of a base station, UL may refer to data that is received by the base station from user equipment (UE), which may include end-user devices such as mobile phones and computers. DL (downlink) may refer to downstream communications. Continuing with the example of the base station, DL may refer to data to be transmitted to the UE. Accordingly when a frame, subframe, slot, or symbol is a DL frame, subframe, slot, or symbol, the respective times corresponding to the frame, subframe, slot, or symbol are used (or indicated for use) for DL communication. Similarly, when a frame, subframe, slot, or symbol is a UL frame, subframe, slot, or symbol, the corresponding time is used (or indicated for use) for UL communication. A symbol, as used herein, may refer to a state (e.g., UL, DL, GP) of the channel (e.g., a CC) during a respective unit interval of time (e.g., the smallest unit of time for which a channel state may be set for a given CC).

In 5G-NR, in various examples, a unified frame of 10 ms duration is used for both FDD and TDD operation, with 10 subframes of 1 ms duration each. In each subframe, 1, 2, 4, 8, or 16 slots may be used per subcarrier spacing. Each slot may include 14 symbols that are of three types: D (for downlink), U (for uplink) and F (for flexible). In FDD operation, when all D is used, a subframe is assigned to a DL band, or when all U is used, the subframe is assigned to an UL band. In TDD operation, 56 different UL-DL patterns may be supported. A "D" subframe is used to refer to a subframe with all D symbols, and "U" to denote a subframe with all U symbols.

In various embodiments, the skew calibration control logic 110 may be configured to use, or cause to be used, one of two UL-DL patterns of the 56 different UL-DL patterns. For example, timing skew calibration control logic 110 may be configured to use, or cause to be used, one of two UL-DL patterns: "DDDSU DDDSU" or "DDDDD DDSUU" for a given TDD frame. Accordingly, in various examples, a special subframe, "S," is used to denote a subframe with mixed D, G (e.g., guard period), and U symbols. In various embodiments, the S subframe may comprise 14 symbols having a 10:2:2 ratio of D, G, and U symbols (e.g., "DDDDDDDDDDGGUU").

With this basic structure in mind, examples of a 4G-LTE TDD frame and 5G-NR TDD frame are described below, with reference to FIGS. 2 & 3, in accordance with the embodiments set forth above.

Figure 2:
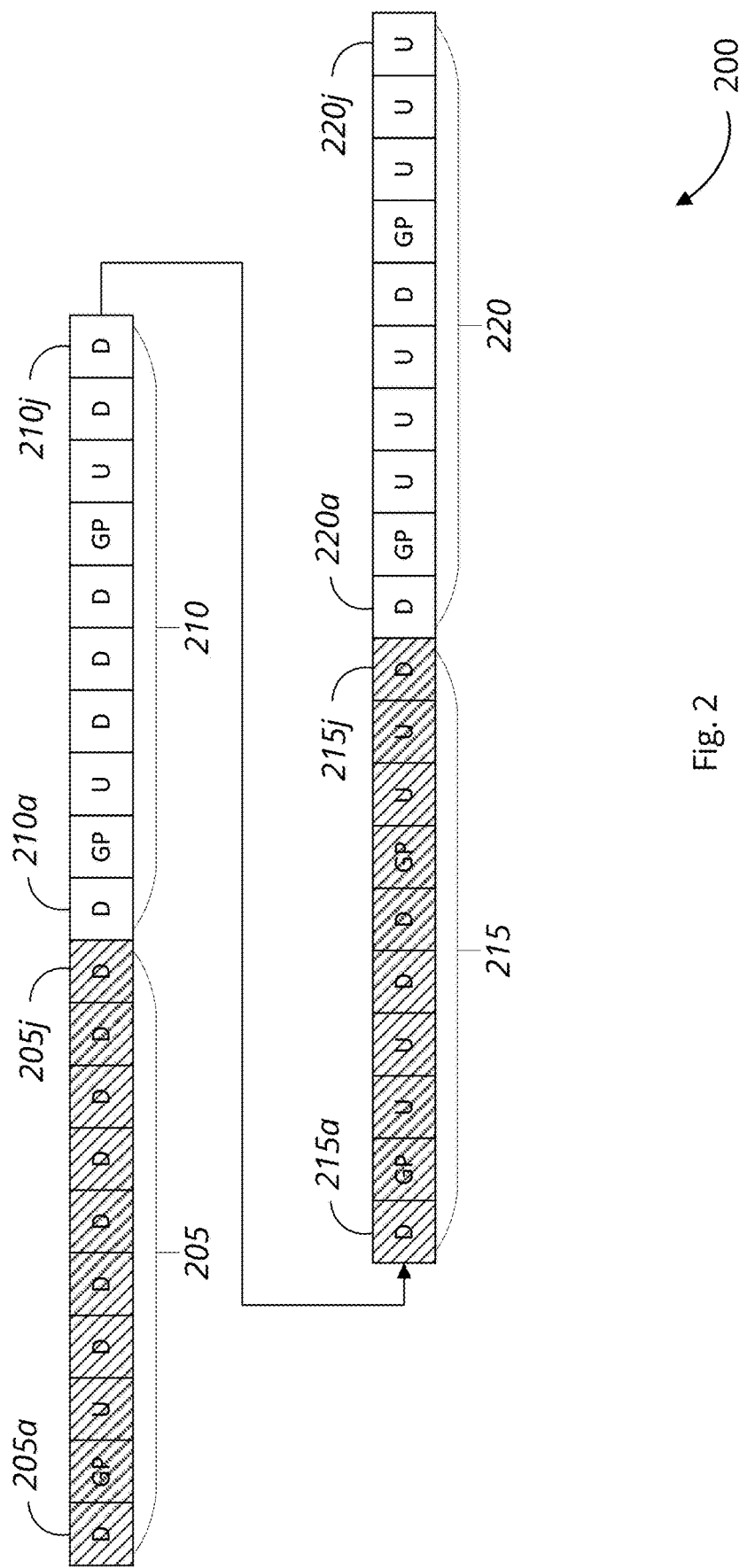
FIG. 2 is a schematic block diagram of fourth-generation long-term evolution (4G-LTE) time division duplex (TDD) radio frames, in accordance with various embodiments.

FIG. 2 is a schematic block diagram of 4G-LTE TDD radio frames 200, in accordance with various embodiments. The 4G-LTE TDD radio frames 200 include a first radio frame 205, second radio frame 210, third radio frame 215, and fourth radio frame 220. The first radio frame 205 includes 10 subframes, a first subframe 205*a* through a tenth subframe 205*j*. Similarly, the second radio frame 210 includes 10 subframes, a first subframe 210*a* through a tenth subframe 210*j*. Each of the third and fourth radio frames 215, 220 may respectively include 10 subframes, starting from a respective first subframe 215*a*, 220*a* through a tenth subframe 215*j*, 220*j*. It should be noted that arrangement of the 4G-LTE TDD radio frames 200 are schematically illustrated in FIG. 2, and that modifications to arrangement of frames 205, 210, 215, 220, subframes 205*a*-205*j*, 210*a*-210*j*, 215*a*-215*j*, 220*a*-220*j*, and symbols may be possible and in accordance with the various embodiments.

In various embodiments, the first radio frame 205 includes a first subframe 205*a* through a tenth subframe 205*j*, having a UL-DL pattern of "D, GP, U, D, D, D, D, D, D, D," starting with the first subframe 205*a* being a "D" subframe, and the second subframe 205*b* being a "GP" subframe, third subframe 205*c* being a "U" subframe, and all subsequent subframes 205*d*-205*j* of the first frame 205 being "D" subframes. As previously described, a "D" subframe may indicate that the subframe includes all D symbols. A "GP" subframe may indicate a special subframe of mixed symbols, including D, G, and U symbols. In various embodiments, GP subframes may include 14 symbols in the following order: "DDDDDDDGGUUUUU." A second frame 210 includes subframes 210*a*-210*j* having a UL-DL pattern of "D, GP, U, D, D, D, GP, U, D, D." The third subframe 215 includes subframes 215*a*-215*j* following the UL-DL pattern "D, GP, U, U, D, D, GP U, U, D," and the fourth subframe 220 includes subframes 220*a*-220*j* following the UL-DL pattern "D, GP, U, U, U, D, GP, U, U, U."

The 4G-LTE preferred DL/UL ratio is 20/13 and is widely adopted by 4G-LTE mobile network operators (MVOs). For mid-band TDD operations, the worldwide trend is to adopt a SFN (Single Frequency Network) where all the networks are timing synchronized with unified TDD frame and timing control to minimize TDD interference. In various embodiments, a TDD frame control may be adopted in which at least two out of every four frames following a UL-DL pattern according to configuration numbers 0, 1, 2, or 6, having 5 ms periodicity, are picked for 4G-LTE TDD. The first frame 205 may, thus, follow a UL-DL pattern according to TDD configuration number 5, having a periodicity of 10 ms. The second frame 210 may follow a UL-DL pattern according to TDD configuration 2, third frame 215 may follow a UL-DL pattern according to TDD configuration 1, and the fourth frame 220 may follow a UL-DL pattern according to TDD configuration 0. Thus, a 20/13 DL/UL ratio may be implemented with 4 frames of 10 ms, or 40 subframes. It is to be understood that in other embodiments, other cyclic permutations accomplishing the same may be utilized, in which at least two frames following one of configuration numbers 0, 1, 2, and 6 are selected.

Figure 3:
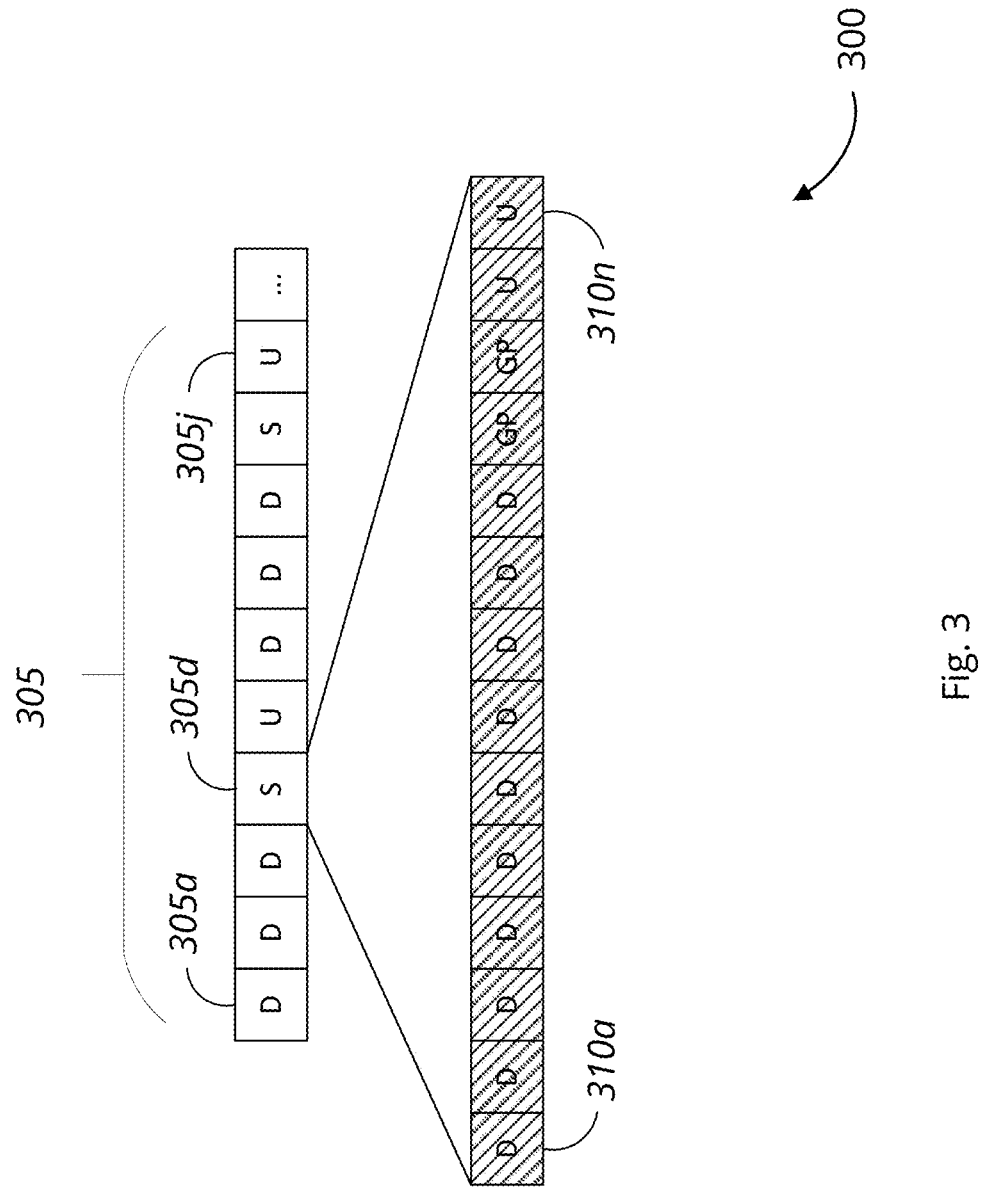
FIG. 3 is a schematic block diagram of a fifth generation new-radio (5G-NR) TDD radio frame, in accordance with various embodiments.

FIG. 3 is a schematic block diagram of fifth generation new-radio (5G-NR) TDD radio frames 300, in accordance with various embodiments. The 5G-NR TDD radio frames 300 include a first radio frame 305, which includes a first subframe 305a through a tenth subframe 305j. The fourth subframe 305d and ninth subframe 305i are special subframes, denoted by the letter "S." Each subframe may include 14 symbols. The symbols of the fourth subframe 305d are shown, starting from a first symbol 310a through a fourteenth symbol 310n. It should be noted that arrangement of the 5G-NR TDD radio frames 300 are schematically illustrated in FIG. 3, and that modifications to arrangement of frames 305, subframes 305a-305j, and symbols 310a-310n may be possible and in accordance with the various embodiments.

In various embodiments, the first radio frame 305 includes a first subframe 305a through a tenth subframe 305j, having a UL-DL pattern of "D, D, D, S, U, D, D, D, S, U," starting with the first subframe 305a being a "D" subframe, the second subframe 305b being a "D" subframe, third subframe 305c being a "D" subframe, fourth subframe 305d being an "S" subframe, fifth subframe 305e being a "U" subframe, and all subsequent subframes 305f-305j repeating the pattern "D, D, D, S, U." As previously described, a "D" subframe may indicate that the subframe includes all D symbols. An "S" subframe may indicate a special subframe of mixed symbols, including D, G, and U symbols. In various embodiments, S subframes may include 14 symbols in the following order: "DDDDDDDDDDDG-GUU," following a 10:2:2 ratio of D:G:U symbols.

In various embodiments, for most of 5G NR bands, and in particular, the n77 and n78 bands spanning in frequency from 3.4 GHz-3.8 GHz, the TDD Frame DDDSU is employed. This corresponds to a DL/UL symbol ratio of =4×(52:16)=204:64, where the two guard period symbols "G" have a duration of 2 symbols. It is to be understood that in other embodiments, another UL-DL pattern may be used. Specifically, an alternative UL-DL pattern of "D, D, D, D, D, D, D, S, U, U" of subframes may be utilized, as will be described in greater detail below with respect to FIG. 4, below.

Figure 4:
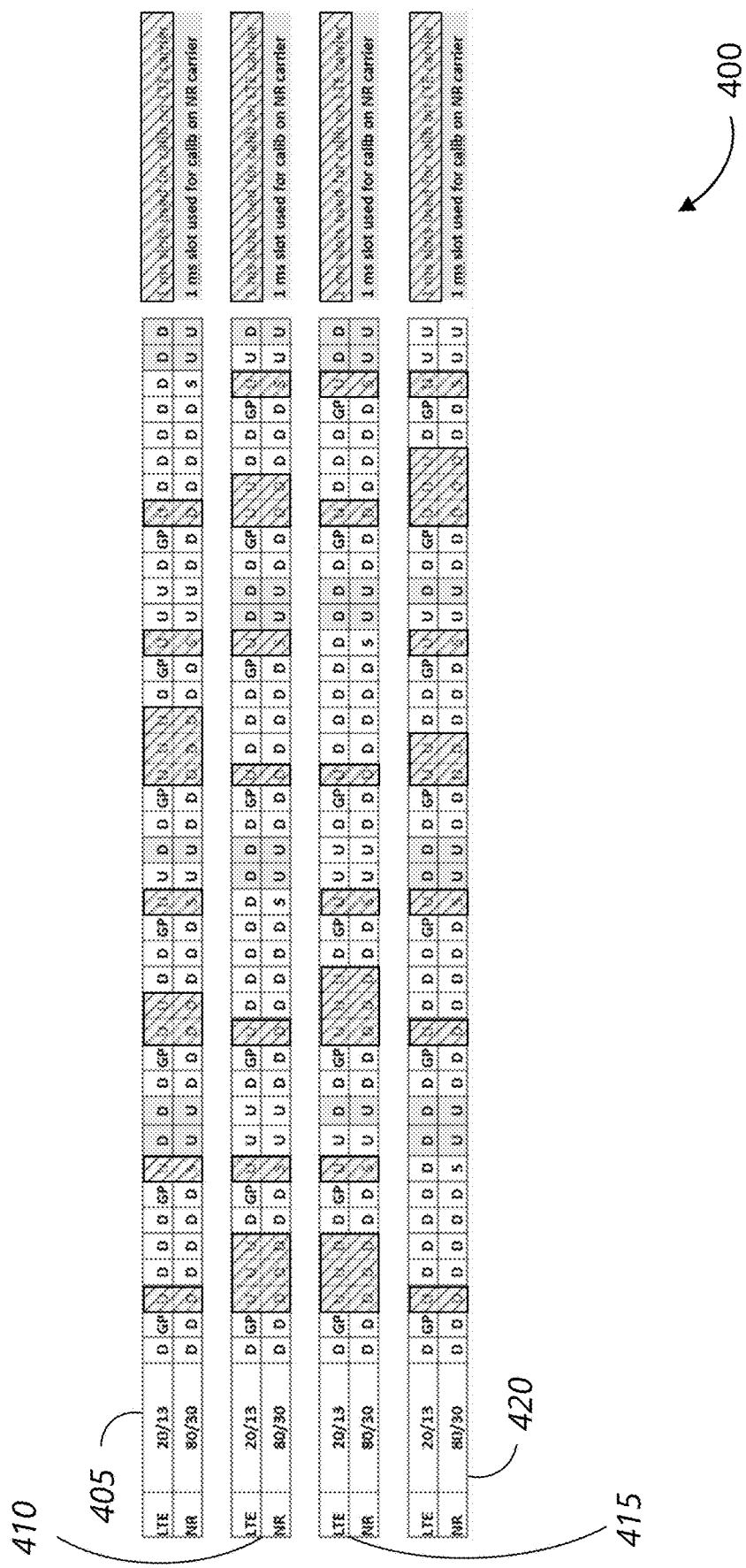
FIG. 4 is a schematic diagram illustrating one example of a frame control scheme for a TDD-TDD component carrier, in accordance with various embodiments.

FIG. 4 is a schematic diagram illustrating one example of a frame control scheme 400 for a TDD-TDD CC carrier aggregation scenario, in accordance with various embodiments. Specifically, CA combining a 4G-LTE CC and 5G-NR CC, both operating in TDD are depicted. While FIG. 4 depicts a specific 5G-NR CC numerology (e.g., a 15 kHz subcarrier spacing corresponding to numerology 0) that is chosen for purposes of explanation, it is to be understood that in other embodiments, a different 5G numerology may be utilized by the 5G-NR CC, which results in a different frame structure from that depicted in FIG. 4. As previously described, in other embodiments, each subframe may include 1, 2, 4, 8, or 16 slots, depending on subcarrier spacing.

Thus, frame control scheme 400 presents a simplified case where slots of the 5G-NR TDD frames have the same duration as a 4G-LTE subframe (e.g., 1 ms), and techniques for timing skew calibration to operate within the time periods where there is only one TDD or FDD component carrier present while other TDD component carriers are in downlink transmission. Specifically, in frame control scheme 400, the subcarrier spacing of 15 kHz is used for both 4G-LTE CCs, and 5G-NR CCs. The 1 ms 4G-LTE subframe corresponds to one 5G-NR slot. Frame control scheme 400 shows both 4G-LTE and 5G-NR CCs over a duration of 40 ms (a period of 4 frames), aligned in uplink.

In other examples employing other 5G numerologies, with respective subcarrier spacing of 30 kHz, 60 kHz, and 120 kHz, one 5G subframe of 1 ms may include 2, 4, and 8 slots, respectively, each with respective durations of 0.5 ms, 0.25 ms, and 0.125 ms. Thus, the 1 ms 5G-NR subframe may include 2, 4, or 8 slots, where each slot further includes 14 symbols. As such, in some examples, the TDD DL/UL patterns are scheduled at a subframe level for 4G-LTE, and on a slot level for 5G-NR, and the relative timing relationships may be different from that depicted in frame control scheme 400. However, the same principles of timing skew calibration remain applicable in finer granularity at the symbol level, in particular, in "S" slots. Thus, it is to be understood that embodiments should not be limited to any single 5G-NR numerology or frame structure, and in other embodiments, other 5G-NR numerologies may be utilized.

Accordingly, in various embodiments, the frame control scheme 400 includes a first scheme 405, second scheme 410, third scheme 415, and fourth scheme 420, which varies depending on the 5G-NR TDD frame utilized (e.g., a repeating "DDSSU" pattern or a "DDDDD DDSUU" pattern). Using the n77 3.5 GHz band as an example, for most of 5G-NR bands, and in particular the n77 and n78 bands, the TDD Frame DDDSU(12:2:2) is deployed.

In various embodiments, 4G-LTE bands (lower) may use "DGPUDD DGPUDD DGPUUD DGPUUD DGPUUU DGPUUU DGPUDD DDDDD" for a 20/13 DL/UL ratio, in 4 possible permutations, as shown in the first through fourth schemes 405-420. 5G-NR bands correspondingly use either a "DDDSU DDDSU DDDSU DDDSU DDDSU DDDSU DDDSU DDDSU" or "DDDDD DDSUU DDDDD DDSUU DDDDD DDSUU DDDDD DDSUU" for an 80/30 DL/UL ratio. As shown below, in various embodiments, time periods corresponding to shaded slots (which in this example correspond to the entire subframe) indicate time periods that may be used for skew calibration of the 5G-NR carrier alone, while time periods corresponding to hatched slots (which corresponds to the subframe) may be used for skew calibration of the 4G-LTE carrier alone, for single carrier skew calibration.

Accordingly, in various embodiments, in the first scheme 405, the 4G-LTE CC may utilize a DGPUDD DGPUDD DGPUUD DGPUUD DGPUUU DGPUUU DGPUDD DDDDD" UL-DL pattern. In the second scheme 410, the 4G-LTE CC may utilize a "DGPUUU DGPUUU DGPUDD DDDDD DGPUDD DGPUDD DGPUUD DGPUUD" UL-DL pattern. In the third scheme 415 the 4G-LTE CC may utilize a "DGPUUD DGPUUD DGPUUU DGPUUU DGPUDD DDDDD DGPUDD DGPUDD" UL-DL pattern. In the fourth scheme 420, the 4G-LTE CC may utilize a "DGPUDD DDDDD DGPUDD DGPUDD DGPUUD DGPUUD DGPUUU DGPUUU" UL-DL pattern. In each of the first through fourth schemes, the 5G-NR CC may, utilize a "DDDDD DDSUU DDDDD DDSUU DDDDD DDSUU DDDDD DDSUU" UL-DL pattern for an 80/30 DL/UL ratio.

Accordingly, in various embodiments, a CC may be calibrated during an uplink subframe, slot, and/or symbol while all other CCs are in a downlink (or special/guard period) subframe, slot, or symbol. This is described in greater detail below with respect to the timing diagrams of FIGS. 5 & 6. Moreover, while the examples above and timing diagrams below may refer to a two-CC example, it is to be understood that in other embodiments, more than two CCs may be present. Specifically, where two or more component carriers are present at the same time to a timing skew calibration subsystem (e.g., timing skew calibration control logic and timing skew calibration circuit), possible risks of inter-carrier interference may occur, degrading the performance. Thus, timing skew calibration is performed selectively to periods where only one component carrier is present. Thus, in cases where TDD CCs in both 4G-LTE and/or 5G NR systems are simultaneously received by an uplink receiver using the TI-ADC, time periods when only one uplink CC is present to the timing skew calibration subsystem of the uplink receiver are utilized for calibration, where multiple FDD and/or TDD CCs may be present during operation of the uplink receiver in CA mode.

Figure 5:
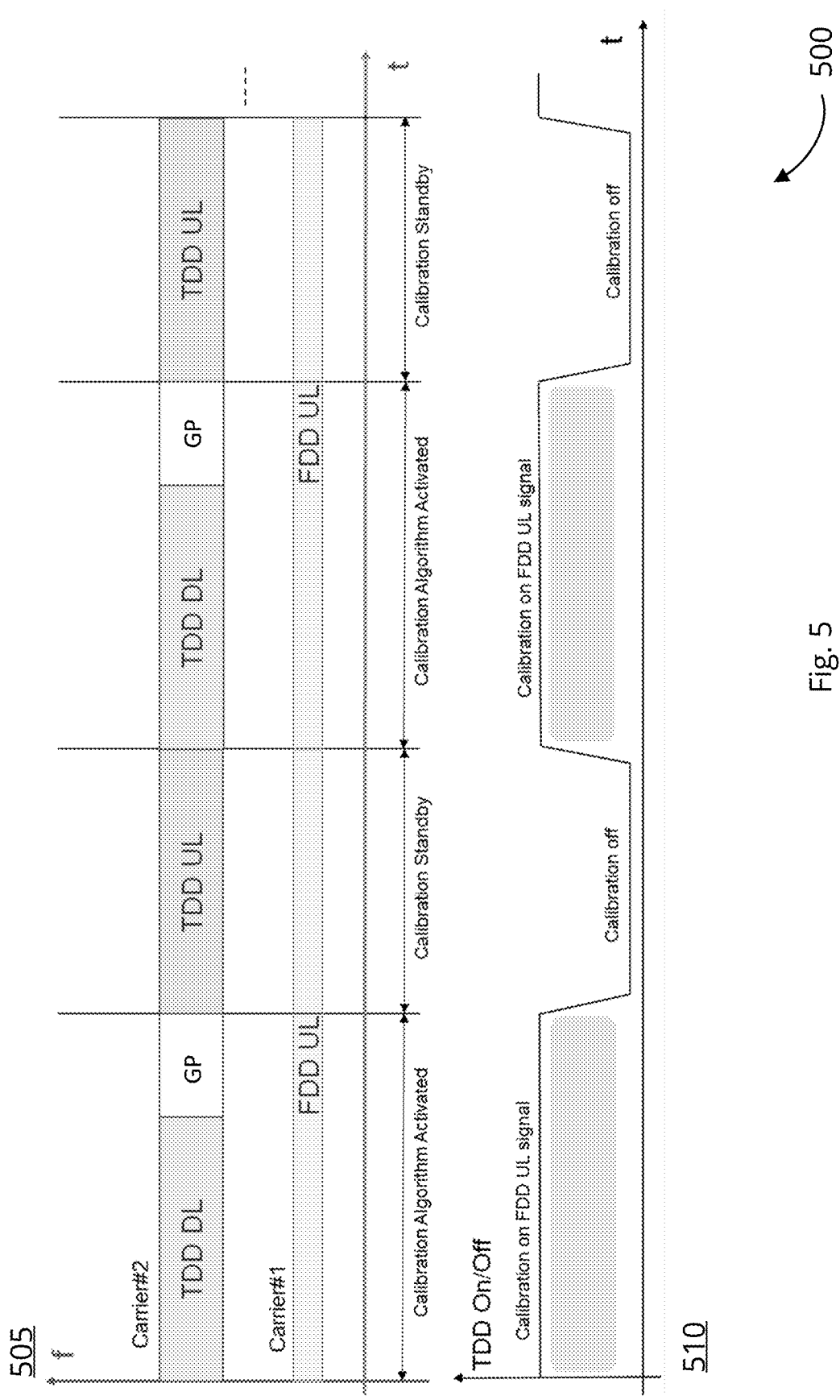
FIG. 5 is a timing diagram illustrating a timing skew calibration control scheme for an FDD-TDD component carrier, in accordance with various embodiments.

FIG. 5 is a timing diagram 500 illustrating a timing skew calibration control scheme for an FDD-TDD component carrier, in accordance with various embodiments. Specifically, the timing diagram 500 illustrates a timing diagram for a skew calibration control scheme for various embodiments where the 4G-LTE carrier (e.g., CC) may operate in FDD, while the 5G-NR carrier operates in TDD.

A first timing diagram 505 illustrates a TDD subframe state for a second carrier (e.g., 5G-NR carrier), while the band associated with the first carrier (e.g., 4G-LTE carrier) is an UL band. The second timing diagram 510 illustrates a TDD on/off signal (of the second carrier) over time. Specifically, timing skew calibration of the first carrier operating in FDD only occurs in the shaded region while TDD of the second carrier is "on" (e.g., TDD is one of a downlink or S/GP subframe, or a downlink symbol of an S/GP subframe). Thus, while TDD is on, calibration may occur on the FDD UL signal of the first carrier, and in a calibration standby state while TDD is off (e.g., is an uplink subframe and/or an uplink symbol of a special frame).

Figure 6:
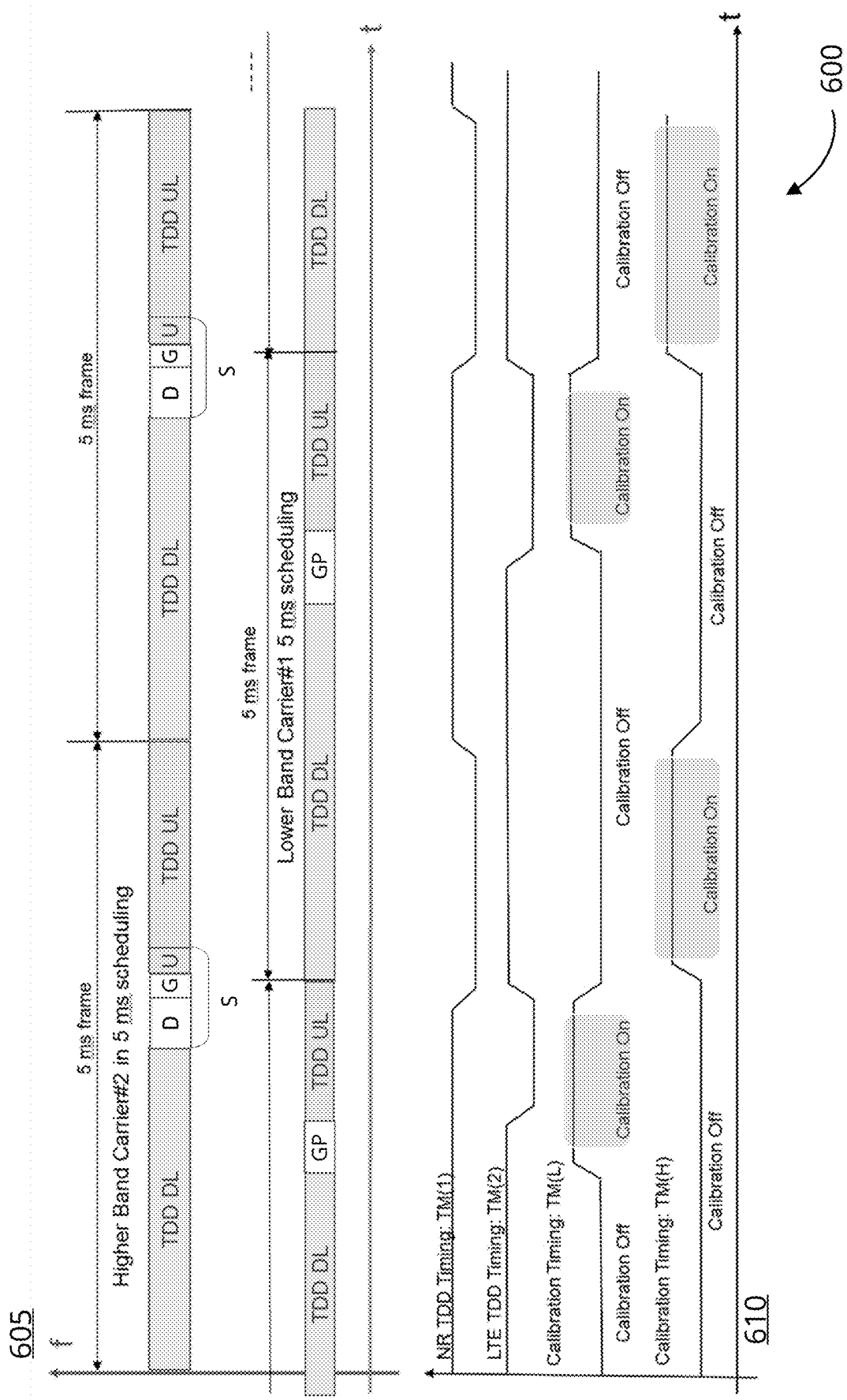
FIG. 6 is a timing diagram illustrating a timing skew calibration control scheme for a TDD-TDD component carrier, in accordance with various embodiments.

FIG. 6 is a timing diagram 600 illustrating a timing skew calibration control scheme for a TDD-TDD component carrier, in accordance with various embodiments. Specifically, the timing diagram 600 illustrates a timing diagram for a skew calibration control scheme for various embodiments where the 4G-LTE carrier and 5G-NR carrier operate in TDD.

A first timing diagram 605 illustrates TDD subframes for a lower band, carrier 1 (e.g., 4G-LTE), and a higher band, carrier 2 (e.g., 5G-NR carrier). In various embodiments, the higher band includes TDD DL subframes (e.g., all D subframes, in which all symbols in the subframes are downlink D symbols), followed by a special subframe or "S" subframe, which includes D, G, and U symbols in a 10:2:2 symbol ratio, followed by TDD UL subframes (e.g., all U subframes, in which all symbols in the subframes are uplink U symbols). For the lower band carrier 2, TDD DL subframes are followed by a guard period (e.g., GP) subframe, which, for example, may include D, G, and U symbols in a 7:2:5 symbol ratio, followed by TDD UL subframes.

In various embodiments, although the higher band carrier 2 and lower band carrier 1 both exhibit 10 ms frames, with 5 ms UL-DL periodicity, the TDD timing may be offset, such that carrier 1 TDD timing is turned on (e.g., in a DL state) to coincide with the U symbols of the S subframe of carrier 2. In this way, calibration control may be staggered between the two carriers, as set forth in the second timing diagram 610 (e.g., a calibration control signal timing diagram) as provided via the use of a unified TDD frame and synchronized timing control, for example, in a SFN.

The second timing diagram depicts a TDD on/off signal of the second carrier (carrier 2) at the top, followed by the first carrier (carrier 1), followed by calibration control timing for carrier 1, followed by calibration control timing for carrier 2. As shown, and previously described with respect to FIG. 4, calibration of carrier 1 may occur while TDD is in an off state for carrier 1 (e.g., TDD UL), and an on state for carrier 2 (e.g., TDD DL). In some examples, calibration may be turned on during a GP subframe of carrier 1. This may include during a U symbol of a GP subframe. In further examples, calibration may be turned on during a G symbol of a GP subframe. Similarly, calibration may be turned off when TDD is turned on (e.g., TDD DL subframe) for carrier 1. In some examples, this may occur during an S subframe of carrier 2. In further examples, this may coincide with the beginning of U symbols of the S subframe of carrier 2, while in other examples, this may occur during a G symbol.

Similarly, for carrier 2, calibration may be turned on while carrier 2 is in a TDD UL state (or subframe). In some examples, this may occur during an S subframe, such as during the first U symbol of the S subframe, or during a G symbol of the S subframe. Similarly, this may coincide to a TDD off state of carrier 1, in which carrier 1 transitions from UL to DL operation. In this way skew calibration of a carrier may only be activated while TDD is off on the carrier while it is on for the other carrier with which it is aggregated. While both CCs are on, calibration remains on standby for both carriers, and situations may be avoided in which both CCs are off, through TDD frame control via radio resource control (RRC) at a base station and/or skew calibration control logic implemented at the base station. In some examples, the base station includes one or more of a gNodeB and/or eNodeB.

It is to be understood that in various embodiments, timing skew calibration may be implemented with any suitable techniques for timing skew calibration, including those known to those skilled in the art and to be later developed, and the embodiments described herein are not limited to any single technique for timing skew calibration.

Figure 7:
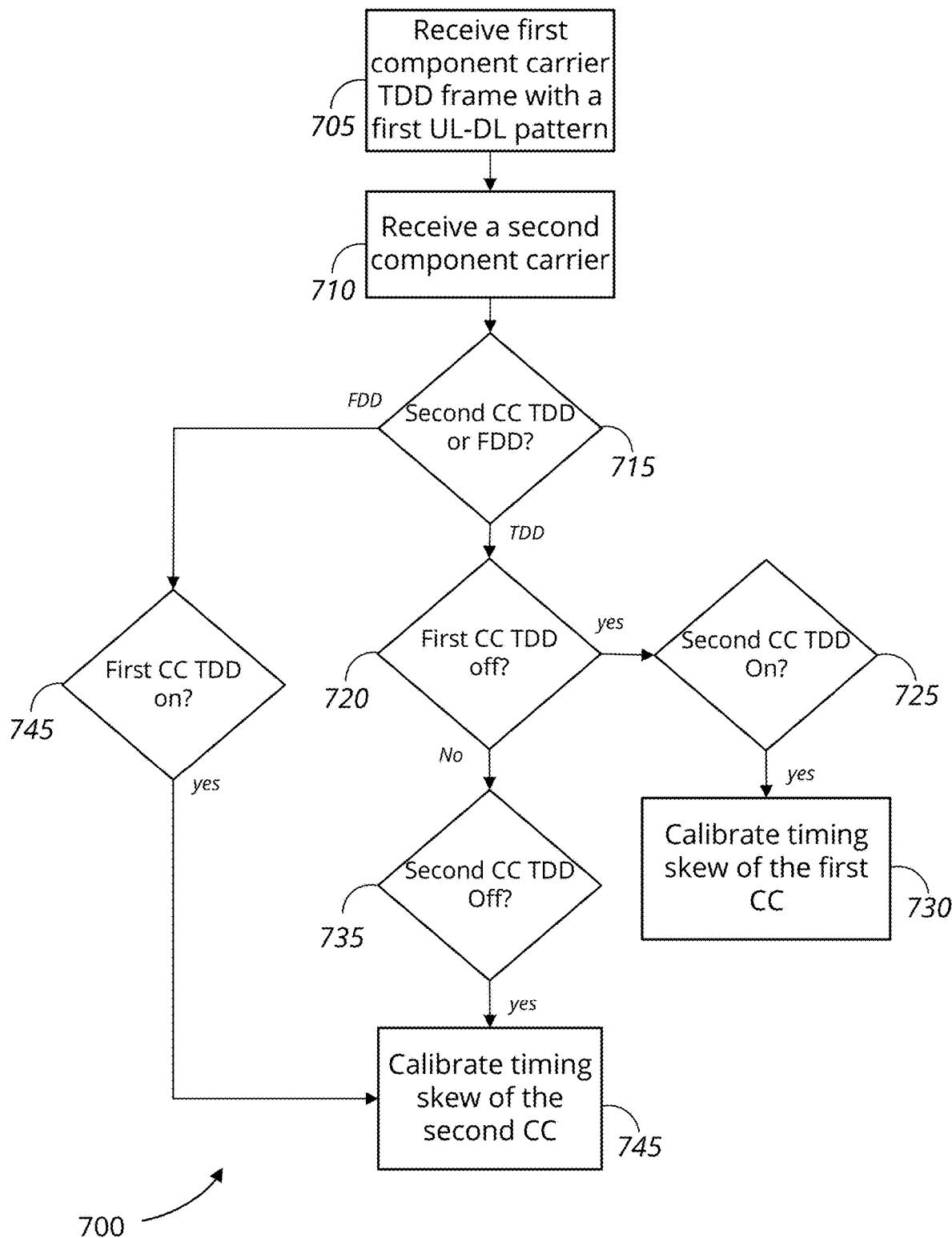
FIG. 7 is a flow diagram of a method for controlling timing skew calibration in TI-ADCs in CA, in accordance with various embodiments.

FIG. 7 is a flow diagram of a method 700 for controlling timing skew calibration in TI-ADCs in CA, in accordance with various embodiments. The method 700 may begin, at block 705, by receiving a first CC TDD frame utilizing a first UL-DL pattern. In various embodiments, the first CC may be a 5G-NR carrier (previously referred to as carrier 2 with respect to FIGS. 5 & 6). In some examples, the first CC may have a first UL-DL pattern of subframes. As previously described, the UL-DL pattern may include one of "DDDSU DDDSU" or "DDDDD DDSUU" for a given TDD frame, in which the UL-DL pattern may be repeated.

The method 700 may continue, at block 710, by receiving a second CC. In some examples, the second CC may be a 4G-LTE carrier (previously referred to as carrier 1 with respect to FIGS. 5 & 6). In some examples, the second CC may be in either FDD or TDD. In some examples, while in TDD, the second CC may have a DL-UL pattern exhibiting a DL/UL ratio of 20/13. As previously described, in some embodiments, 4G-LTE bands (lower) may use "DGPUDD DGPUDD DGPUUD DGPUUD DGPUUU DGPUUU DGPUDD DDDDD," in 4 possible permutations of respective groups of the DL-UL pattern (e.g., group 1: DGPUDD DGPUDD; group 2: DGPUUD DGPUUD; group 3: DGPUUU DGPUUU; and group 4: DGPUDD DDDDD), as shown in FIG. 6.

The method 700 continues, at block 715, by determining an operating mode of the second CC. As used herein, an operating mode may refer to TDD or FDD. Thus, at block 715, in various examples, it is determined whether the second CC is in TDD or FDD mode (or operation). If it is determined that the second CC is in TDD operation, at block 720, the method 700 continue by determining whether the first CC is in a TDD off state. As previously described, in various embodiments, a TDD off state may correspond to an uplink subframe, or in some examples, an uplink symbol in a special subframe, as previously described. The CC is considered in an "on" state when the frame is in one of a downlink or special/GP subframe, or a downlink symbol of a special/GP subframe.

If it is determined, that the first CC is in a TDD off state, the method 700 may continue, at block 725, by determining whether the second CC is in a TDD on state. If the second CC is in a TDD on state, the method 700 may continue, at block 730, by calibrating timing skew of the first CC. Accordingly, in various embodiments, in a TDD-TDD 2-CC scenario, timing skew calibration control logic may be configured to activate timing skew calibration of the first CC when the frame is an uplink "U" symbol (e.g., off), and the second CC is a downlink symbol "D."

If it is determined, at block 720, that the first CC is in a TDD on state, the method 700 may continue, at block 735, by determining whether the second CC is in a TDD off state. If it is determined that the second CC is in a TDD off state, the method 700 may continue, at block 740, by calibrating timing skew of the second CC. As described above, in various embodiments, in a TDD-TDD 2-CC scenario, timing skew calibration control logic may activate timing skew calibration of the second CC during a U symbol of the second CC that occurs concurrently with a D symbol of the first CC.

Similarly, in further embodiments, if it is determined, at block 715, that the second CC is in FDD operation, the method 700 may further include, at block 745, determining whether the first CC is in a TDD on state. If it is determined that the first CC is in a TDD on state, the method 700 may continue, at block 745, by calibrating timing skew of the second CC. As previously described, in various embodiments, in an FDD-TDD scenario, timing skew calibration logic may activate timing skew calibration of the second CC (in FDD).

The techniques and processes described above with respect to various embodiments may be performed by system 100 and/or subsystems and components thereof, such as the skew calibration control logic 110 as described above with respect to FIG. 1, and which may perform the methods provided by various other embodiments, as described herein.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method comprising:
   receiving, using an analog to digital converter, one or more first frames of a first component carrier signal having a first uplink-downlink subframe pattern;
   receiving, using the analog to digital converter, one or more additional frames of at least one additional component carrier signal, the one more or more additional frames including one or more second frames of a second component carrier signal, the at least one additional component carrier signal including the second component carrier signal; and
   activating, using a control logic, timing skew calibration of at least one of the first or second component carrier signals based, at least in part, on an operating mode of the second component carrier signal and respective symbols of the first component carrier signal and second component carrier signal;
   wherein the first uplink-downlink subframe pattern follows a repeated sequence of subframe types.

2. The method of claim 1, further comprising:
   in response to the operating mode of the second component carrier signal being time division duplex:
      activating timing skew calibration of the first component carrier signal during an uplink symbol of the first component carrier signal that occurs concurrently with a downlink symbol of the second component carrier.

3. The method of claim 1, further comprising:
   in response to the operating mode of the second component carrier signal being time division duplex:
      activating timing skew calibration of the second component carrier signal during an uplink symbol of the second component carrier signal that occurs concurrently with a downlink symbol of the first component carrier.

4. The method of claim 1, further comprising:
in response to the operating mode of the second component carrier signal being frequency division duplex:
activating timing skew calibration of the second component carrier signal during a downlink symbol of the first component carrier.

5. The method of claim 1, wherein the first uplink-downlink subframe pattern is a repeating pattern of subframe types D, S, and U, where the subframe type D includes all downlink symbols, subframe type S includes a mixture of downlink, guard period, and uplink symbols, and subframe type U includes all uplink symbols, wherein a first repeated sequence of subframe types follows an order: D, D, D, S, U.

6. The method of claim 5, wherein the S subframe type includes symbols in a symbol sequence of ten downlink symbols, followed by two guard period symbols, followed by two uplink symbols.

7. The method of claim 5, wherein a second repeated sequence of subframe types follows the order: D, D, D, D, D, D, D, S, U, U.

8. The method of claim 7, wherein the first component carrier signal is a fifth generation new radio signal, and the second component carrier signal is a fourth generation long-term evolution signal.

9. An apparatus comprising:
an analog to digital converter configured to:
receive one or more first frames of a first component carrier signal having a first uplink-downlink subframe pattern, and
receive one or more additional frames of at least one additional component carrier signal, the one more or more additional frames including one or more second frames of a second component carrier signal, the at least one additional component carrier signal including the second component carrier signal;
a control logic configured to activate timing skew calibration of at least one of the first or second component carrier signals based, at least in part, on an operating mode of the second component carrier signal and respective symbols of the first component carrier signal and second component carrier signal;
wherein the first uplink-downlink subframe pattern is a repeating pattern of subframe types D, S, and U.

10. The apparatus of claim 9, wherein in response to the operating mode of the second component carrier signal being time division duplex, the control logic is further configured to activate timing skew calibration of the first component carrier signal during an uplink symbol of the first component carrier signal that occurs concurrently with a downlink symbol of the second component carrier.

11. The apparatus of claim 9, wherein in response to the operating mode of the second component carrier signal being time division duplex, the control logic is further configured to activate timing skew calibration of the second component carrier signal during an uplink symbol of the second component carrier signal that occurs concurrently with a downlink symbol of the first component carrier.

12. The apparatus of claim 9, wherein in response to the operating mode of the second component carrier signal being frequency division duplex, the control logic is further configured to activate timing skew calibration of the second component carrier signal during a downlink symbol of the first component carrier.

13. The apparatus of claim 9, where the subframe type D includes all downlink symbols, subframe type S includes a mixture of downlink, guard period, and uplink symbols, and subframe type U includes all uplink symbols, wherein the first uplink-downlink subframe pattern follows a repeated sequence of subframe types, wherein a first repeated sequence of subframe types follows an order: D, D, D, S, U.

14. The apparatus of claim 13, wherein the S subframe type includes symbols in a symbol sequence of ten downlink symbols, followed by two guard period symbols, followed by two uplink symbols.

15. A non-transitory computer readable medium in communication with a processor, the non-transitory computer readable medium having encoded thereon a set of instructions executable by the processor to:
receive one or more first frames of a first component carrier signal having a first uplink-downlink subframe pattern;
receive one or more additional frames of at least one additional component carrier signal, the one more or more additional frames including one or more second frames of a second component carrier signal, the at least one additional component carrier signal including the second component carrier signal; and
activate timing skew calibration of at least one of the first or second component carrier signals based, at least in part, on an operating mode of the second component carrier signal and respective symbols of the first component carrier signal and second component carrier signal;
wherein the first uplink-downlink subframe pattern is a repeating pattern of subframe types D, S, and U, where the subframe type D includes all downlink symbols, subframe type S includes a mixture of downlink, guard period, and uplink symbols, and subframe type U includes all uplink symbols.

16. The non-transitory computer readable medium of claim 15, wherein the set of instructions is further executable by the processor to:
in response to the operating mode of the second component carrier signal being time division duplex:
activate timing skew calibration of the first component carrier signal during an uplink symbol of the first component carrier signal that occurs concurrently with a downlink symbol of the second component carrier.

17. The non-transitory computer readable medium of claim 15, wherein the set of instructions is further executable by the processor to:
in response to the operating mode of the second component carrier signal being time division duplex:
activate timing skew calibration of the second component carrier signal during an uplink symbol of the second component carrier signal that occurs concurrently with a downlink symbol of the first component carrier.

18. The non-transitory computer readable medium of claim 15, wherein the set of instructions is further executable by the processor to:
in response to the operating mode of the second component carrier signal being frequency division duplex:
activate timing skew calibration of the second component carrier signal during a downlink symbol of the first component carrier.

19. The non-transitory computer readable medium of claim 15, wherein the first uplink-downlink subframe pattern follows a repeated sequence of subframe types, wherein a first repeated sequence of subframe types follows an order: D, D, D, S, U, wherein the S subframe type includes symbols in a symbol sequence of ten downlink symbols, followed by two guard period symbols, followed by two uplink symbols.

20. The non-transitory computer readable medium of claim 15, wherein the second component carrier signal has a second uplink-downlink subframe pattern of subframe types D, GP, and U, where the subframe type D includes all downlink symbols, subframe type GP includes a mixture of downlink, guard period, and uplink symbols, and subframe type U includes all uplink symbols, wherein the second uplink-downlink subframe pattern comprises four respective groups of sequences of subframe types, wherein the four respective groups includes a first group following an order: D, GP, U, D, D, D, GP, U, D, D, a second group following the order: D, GP, U, U, D, D, GP, U, U, D, a third group following the order: D, GP, U, U, U, DG, P, U, U, U, and a fourth group following the order: D, GP, U, D, D, D, D, D, D, and wherein the second uplink-downlink subframe pattern is a permutation of the four respective groups of sequences of subframe types.

\* \* \* \* \*